United States Patent
Gupta et al.

(10) Patent No.: US 8,655,323 B2
(45) Date of Patent: Feb. 18, 2014

(54) MOBILE-ORIGINATED VOICEMAIL MESSAGES WITH LOCATION METADATA

(75) Inventors: Amit Gupta, Edison, NJ (US); Shahid Ahmed, Monmouth Junction, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 161 days.

(21) Appl. No.: 12/980,974

(22) Filed: Dec. 29, 2010

(65) Prior Publication Data

US 2012/0172008 A1  Jul. 5, 2012

(51) Int. Cl.
*H04M 11/00* (2006.01)
(52) U.S. Cl.
USPC ............ 455/413; 455/412.1; 455/412.2; 455/414.1; 455/456.1; 455/456.3
(58) Field of Classification Search
None
See application file for complete search history.

(56) References Cited

U.S. PATENT DOCUMENTS

| | | | |
|---|---|---|---|
| 5,539,809 A * | 7/1996 | Mayer et al. | 379/210.02 |
| 6,690,774 B1 * | 2/2004 | Chang et al. | 379/88.23 |
| 7,336,963 B1 * | 2/2008 | Rayburn et al. | 455/456.3 |
| 2005/0227711 A1 * | 10/2005 | Orwant et al. | 455/456.3 |
| 2006/0223502 A1 | 10/2006 | Doulton | |
| 2006/0291629 A1 * | 12/2006 | Esh et al. | 379/67.1 |
| 2007/0143495 A1 * | 6/2007 | Porat | 709/238 |
| 2007/0218923 A1 * | 9/2007 | Park et al. | 455/456.2 |
| 2008/0195702 A1 | 8/2008 | Matz | |
| 2009/0186629 A1 * | 7/2009 | Soelberg et al. | 455/456.1 |
| 2010/0022255 A1 | 1/2010 | Singhal | |
| 2010/0029302 A1 * | 2/2010 | Lee et al. | 455/456.6 |
| 2010/0056113 A1 | 3/2010 | Silverman | |
| 2010/0130173 A1 | 5/2010 | Gupta | |

OTHER PUBLICATIONS

GSM Association, Voice Messaging Service Definition, Version 1.4, Official Document SE.46, Jul. 20, 2007, 21 pages.

* cited by examiner

*Primary Examiner* — Suhail Khan

(57) ABSTRACT

A voicemail message system may process voicemail messages sent by mobile communication devices. A network interface may receive the voicemail messages over a network communication system. Each voicemail message may include metadata relating to the voicemail message containing location information indicative of the location of the mobile communication device at approximately the time the message is sent by the mobile communication device. A voicemail message processing system may cause each message which is received by the network interface to be stored in a message storage system, along with its location information. Related mobile communication devices, telephone switches, and recipient phone call devices are also described.

19 Claims, 4 Drawing Sheets

MOBILE-ORIGINATED VOICEMAIL MESSAGES WITH LOCATION METADATA

BACKGROUND

1. Technical Field

This disclosure relates to mobile communication devices, such as cell phones, and to related message systems, such as voicemail message systems.

2. Description of Related Art

Mobile communication devices, such as cell phones, may be configured to place phone calls. When the calls are unanswered, the mobile communication devices may record voicemails for the recipients.

Recipients of these voicemail messages may find certain information about the callers to be helpful, such as information about the location of the callers. Such location information, for example, may be of interest to parents of message-leaving children, emergency personnel who may wish to provide immediate aid to callers, and to friends and relatives who may find it helpful to know whether out-of-town callers are visiting. Callers, however, may not always provide location information in their voicemail messages. Even when they do, the location information may not be very precise.

SUMMARY

A message system may process messages sent by mobile communication devices. A network interface may receive the messages over a network communication system. Each message may include metadata relating to the message containing location information indicative of the location of the mobile communication device at approximately the time the message is sent by the mobile communication device. A message processing system may cause each message which is received by the network interface to be stored in a message storage system, along with its location information.

The message system may be a voicemail message system, the messages may be voicemail messages, the storage system may be a voicemail message storage system, and the message processing system may be a voicemail message processing system.

The metadata may be contained within a message envelope.

The voicemail message processing system may cause the network interface to send a question to each mobile communication device in an audible or text format over the network communication system at approximately the time it receives each voicemail message from each mobile communication device. The question may ask whether location information should be included with the voicemail message. The network interface may receive a response to the question from each mobile communication device over the network communication system in an audible or text format.

The metadata may include recipient information indicative of at least one intended recipient of the voicemail message. The voicemail message processing system may cause the network interface to deliver each voicemail message to its intended recipient over the network communication system in an audible or text format, along with its location information.

The voicemail message processing system may cause the network interface to send a question to each intended recipient in an audible or text format over the network communication system asking whether the intended recipient wants to receive the location information, in addition to the voicemail message.

The network interface may receive a response to the question from each intended recipient over the network communication system in an audible or text format. The voicemail message processing system may cause the network interface to send the location information to each intended recipient over the network communication system in an audible or text format only if the response from the intended recipient indicates that the intended recipient wants to receive the location information.

The location information in each voicemail message may include information about the geographic coordinates of each mobile communication device. The voicemail message processing system may translate each set of the geographic coordinates into a street address.

A mobile communication device may include a wireless communication system which may wirelessly communicate communications over a network communication system, including messages from a user of the mobile communication device to a message system. A location-determining system may determine the location of the mobile communication device. A location-determining system may cause the wireless communication system to include metadata with each message relating to the message containing location information indicative of the location of the mobile communication device at approximately the time the message is sent.

The message may be a voice mail message and the message system may be a voicemail message system.

A user interface may allow the user to specify whether the location information is to be delivered to the voicemail message system. The location delivery system may cause the wireless communication system to deliver the location information to the voicemail message system only when the user has specified through the user interface that it is to be delivered.

The mobile communication device may include a storage system configured to store the specification which the user enters through the user interface about whether the location information is to be delivered to the voicemail message system. The location delivery system may read the stored specification about whether the location information is to be delivered to the voicemail message system from the storage system each time the user leaves a voicemail message with the voicemail message system, and cause the wireless communication system to deliver the location information to the voicemail message system only when the stored specification indicates that it is to be so delivered.

The storage system may store information indicative of the identity of intended recipients of communications. The user interface may allow the user to separately specify whether the location information is to be delivered to the voicemail message system in connection with each stored intended recipient.

A telephone communication device may include a phone call communication system configured to receive phone calls over a network communication system from wireless mobile communication devices. Each phone call may include metadata containing location information indicative of the location of the mobile communication device at approximately the time the message is sent by the mobile communication device. A location communication interface may cause the location information to be communicated to a user of the communication device.

The location communication interface may cause the location information to be communicated to the user contemporaneously with the arrival of the phone call and before it is answered.

The telephone communication device may include a storage system configured to store the location information. The location communication interface may cause the location information to be stored in the storage system and to be communicated to the user thereafter upon request of the user.

A telephone switch may call recipients of phone calls from mobile communication devices. A network interface may receive recipient information from each mobile communication device indicative of a recipient for a phone call which the mobile communication device wishes to place, along with metadata relating to the phone call containing location information indicative of the location of the mobile communication device at approximately the time the phone call is being placed by the mobile communication device. The network interface may send a notice to each recipient indicating that a mobile communication device is calling, along with the location information. A call processing system may cause the network interface to send the notice to each recipient indicating that a mobile communication device is calling, along with the location information.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details which may be apparent or unnecessary may be omitted to save space or for a more effective presentation. Some embodiments may be practiced with additional components or steps and/or without all of the components or steps which are described.

Figure 1:
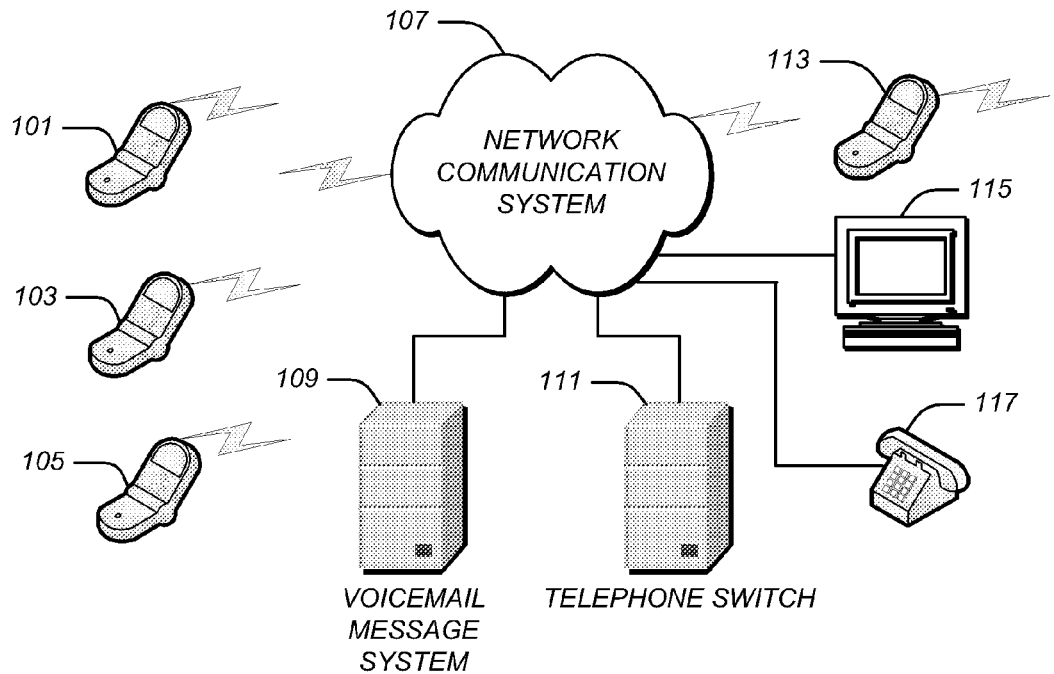
FIG. 1 is an example of a computer network which includes mobile communication devices.

FIG. 1 is an example of a computer network which includes mobile communication devices 101, 103, and 105, a network communication system 107, a voicemail message system 109, a telephone switch 111, and recipient phone call communication devices 113, 115, and 117.

Although illustrated as cell phones, the mobile communication devices 101, 103, and 105 may be of any type. For example, one of the devices may be a laptop computer, a PDA, tablet, online gaming console, or TV console.

The network communication system 107 may be of any type. For example, the network communication system 107 may consist of or include a cellular telephone network communication system, a cellular data communication system, the internet, a wide area network, a local area network, and/or a combination of any of these types of network communication systems.

Figure 2:
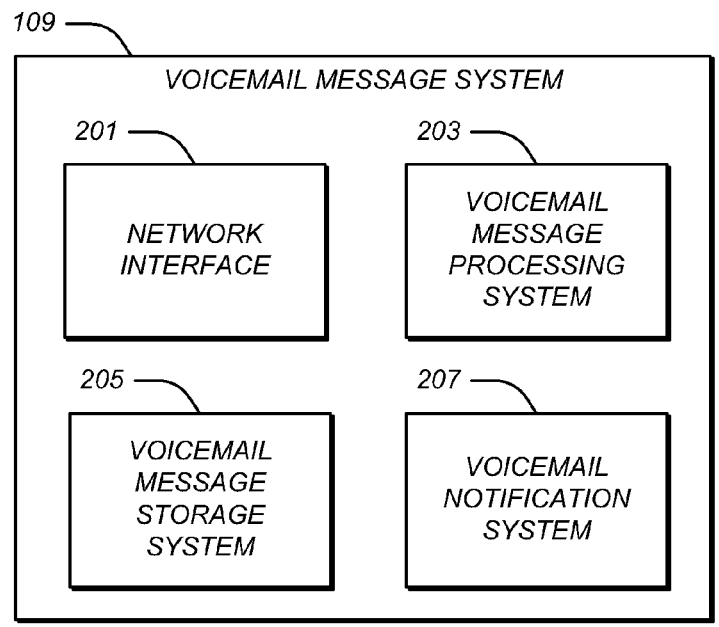
FIG. 2 is an example of the voicemail message system illustrated in FIG. 1.

FIG. 2 is an example of the voicemail message system 109 illustrated in FIG. 1.

The voicemail message system 109 may be configured to process voicemail messages sent by mobile communication devices, such as the mobile communication devices 101, 103, and 105. The voicemail message system 109 illustrated in FIG. 1 may be configured differently than is illustrated in FIG. 2. Similarly, the voicemail message system 109 illustrated in FIG. 2 may be used in connection with computer networks which are different from the one illustrated in FIG. 1.

The network interface 201 may be configured to receive the voicemail messages over the network communication system 107. Each voicemail message may include metadata relating to the voicemail message. The metadata may include location information indicative of the location of the mobile communication device at approximately the time the message is sent by the mobile communication device.

The network interface 201 may be of any type. For example, the network interface may be based on IMAP, HTTP, REST over HTTP, or any proprietary/open source protocol. It may be software only or a combination of a software and hardware based solution.

The voicemail message storage system 205 may be configured to store each voicemail message, along with its location information. The voicemail message storage system 205 may be of any type. For example, the voicemail message storage system 205 may consist of or include one or more hard disk drives and/or RAMs.

The voicemail message processing system may be configured to cause each voicemail message which is received by the network interface 201 to be stored in the voicemail message storage system 205, along with its location information.

The voicemail notification system 207 may be configured to cause notice of a voicemail which is received and stored in the voicemail message storage system 205 to be delivered to the intended recipient of the voicemail message. The voicemail message processing system 203 may be configured to cause the voicemail notification system 207 to issue this notice. The notice may be issued through the network interface 201.

The voicemail message processing system 203 may be configured to cause the network interface 201 to send a question to each mobile communication device over the network communication system 107 at approximately the time it receives each voicemail message from each mobile communication device. The question may be configured to ask whether location information should be included with the voicemail message. The voicemail message processing system 203 may be configured to cause the network interface 201 to send each question over the network communication system 107 in any format, such as in a text and/or audible format.

The voicemail message processing system 203 may be configured to receive from the network interface 201 a response to the question from the mobile communication device over the network communication system 107. The voicemail message processing system may be configured to cause the voicemail message storage system 205 to store the location information if the response is in the affirmative, but not to store the location information if the response is in the negative. The response may be in any format, such as in a text or audible format.

The voicemail message system 109 may be configured to receive voicemail messages which do not include location information from mobile communication devices which do not send such location information. In this situation, the voicemail message system 109 may be configured not to cause the network interface 201 to send a question to the mobile communication device asking whether the location information should be included with the voicemail message.

The metadata which is provided by the wireless mobile communication device may include recipient information indicative of at least one intended recipient of the voicemail message. The voicemail message processing system 203 may be configured to cause the network interface 201 to deliver each voicemail message to its intended recipient over the network communication system 107, along with its location information. The voicemail message may be delivered in any format, such as in a text and/or audible format.

Before doing so, the voicemail message processing system 203 may be configured to cause the network interface 201 to send a question to each intended recipient over the network communication system 107, asking whether the intended recipient wants to receive the location information, in addition to the voicemail. The question may be in any format, such as in a text and/or audible format.

The network interface 201 may be configured to receive a response from each intended recipient to the question and to pass that to the voicemail message processing system 203. The response may be in any format, such as in a text and/or audible format. The voicemail message processing system 203 may be configured to send the location information to each intended recipient over the network communication system 107 only if the response from the intended recipient wants to receive the location information. The location information may be in any format, such as in a text and/or audible format.

The location information which is received from the mobile communication device may include information about the geographic coordinates of each mobile communication device. The voicemail message processing system 203 may be configured to translate each set of geographic coordinates into a street address. It may be configured to do so by consulting a database that cross-references geographic coordinates to street addresses. This database may be contained within the voicemail message system 109 and/or external to it. The voicemail message processing system 203 may be configured to send the translated location information to each recipient, in addition to or instead of the raw geographic coordinates.

Figure 3:
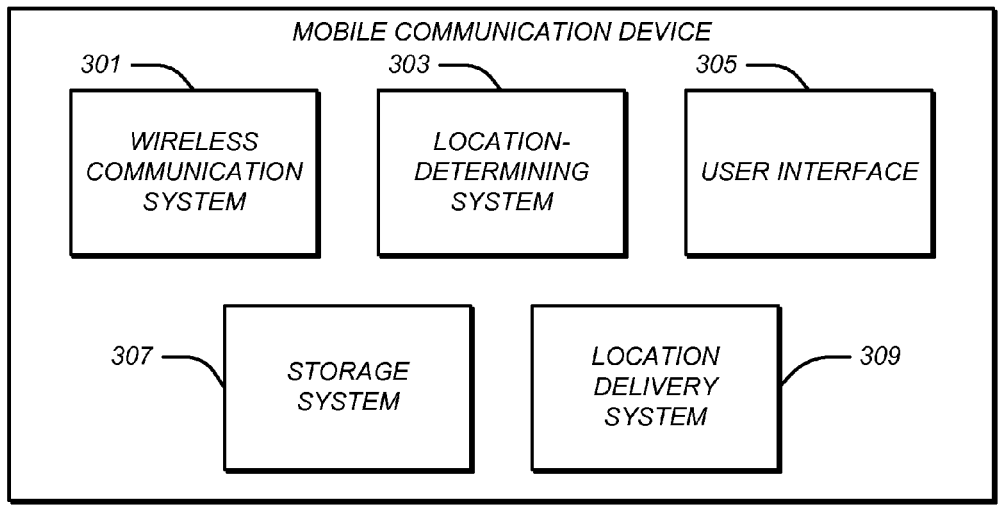
FIG. 3 is an example of one of the mobile communication devices illustrated in FIG. 1.

FIG. 3 is an example of one of the mobile communication devices illustrated in FIG. 1.

One or more of the mobile communication devices illustrated in FIG. 1 may be different from the one illustrated in FIG. 3. Similarly, the mobile communication device illustrated in FIG. 3 may be used in connection with a computer network which is different from the one illustrated in FIG. 1.

The mobile communication device illustrated in FIG. 3 may include a wireless communication system 301, a location-determining system 303, a user interface 305, a storage system 307, and a location delivery system 309.

The wireless communication system 301 may be configured to wirelessly communicate communications over a computer network system, such as the network communication system 107. The communications may include voicemail messages from a user of the mobile communication device. The voicemail message may be directed to a voicemail message system. The wireless communication system 301 may include an antenna, radio transmitter, radio receiver, processing system, storage system, and/or user interface.

The location-determining system 303 may be configured to determine the location of the mobile communication device. The location-determining system may include a GPS receiver and/or it may use triangulation or other techniques for determining this location.

The location delivery system 309 may be configured to cause the wireless communication system 301 to include metadata with each voicemail message relating to the voicemail message. The metadata may contain location information obtained from the location-determining system 303 which is indicative of the location of the mobile communication device at approximately the time the voicemail message is sent.

The user interface 305 may be configured to allow the user to specify whether the location information is to be delivered to the voicemail message system. The location delivery system 309 may be configured to cause the wireless communication system 301 to deliver the location information to the voicemail message system only when the user has specified through the user interface 305 that such location information is to be delivered.

The user interface 305 may be of any type. For example, the user interface may include a display, touch screen, keyboard, mouse pad, microphone, loud speaker, ear phone, and/or any other type of user interface device.

Figure 4:
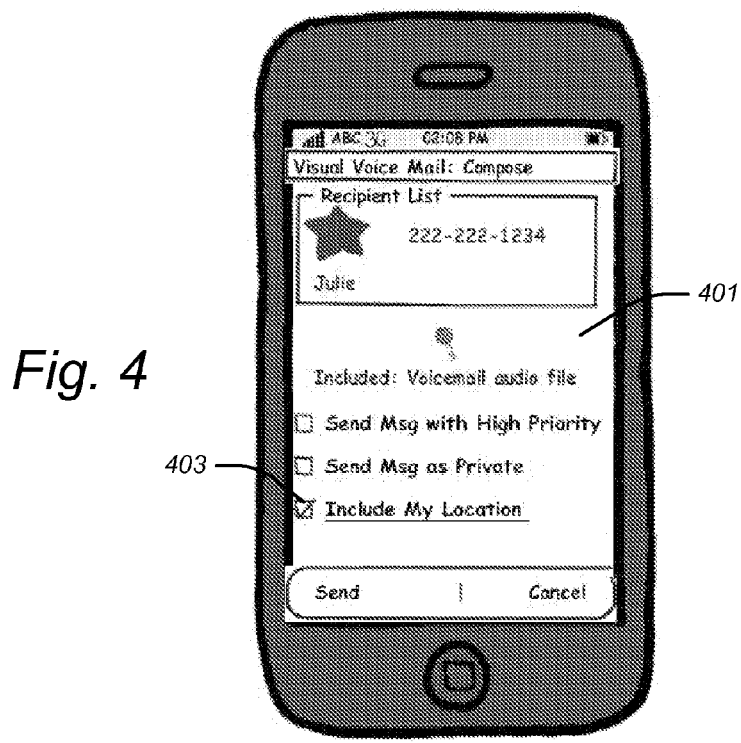
FIG. 4 is an example of a display which may appear on one of the mobile communication devices illustrated in FIG. 1 which displays a check box relating to the delivery of location information along with a voicemail message.

FIG. 4 is an example of a display which may appear on one of the mobile communication devices illustrated in FIG. 1 and which displays a check box relating to the delivery of location information along with a voicemail message.

As illustrated in FIG. 4, a display 401 may be part of the user interface 305 and may be configured to ask a user whether the user wants the location information to be included with a voicemail message to a recipient. This may be facilitated by a check box 403. Check boxes for other characteristics relating to the voicemail message may also be provided, as also illustrated.

This type of visual dialog with a person who delivers a voicemail message may be used in connection with what has become known as visual voicemail, i.e., voicemail which may be communicated to a recipient in a format similar to an email message.

In other configurations, the question may be presented audibly, such as through a voice question, and responded to audibly, such as through a voice answer by the user and/or a touch tone response.

Returning to FIG. 3, the storage system 307 may be configured to store the specification which the user enters through the user interface 305 about whether the location information is to be delivered to the voicemail message system.

The storage system 307 may be of any type. For example, the storage system may include one or more hard disk drives and/or RAMs.

The location delivery system 303 may be configured to read a stored specification about whether the location information is to be delivered to the voicemail message system from the storage system 307 each time the user leaves a voicemail message with the voicemail message system. The location delivery system 309 may be configured to cause the wireless communication system 301 to deliver the location information to the voicemail message system only when the stored specification indicates that it is to be so delivered.

The storage system 307 may be configured to store information indicative of the identify of intended recipients of communications. The user interface 305 may be configured to allow the user to separately specify whether the location information is to be delivered to the voicemail message system in connection with each stored intended recipient. In this configuration, location information may automatically be provided to the voicemail message system each time a voicemail message is left for a recipient who has been designated in the storage system to receive this location information, but not for recipients who have not been so designated.

Figures 5, 6:
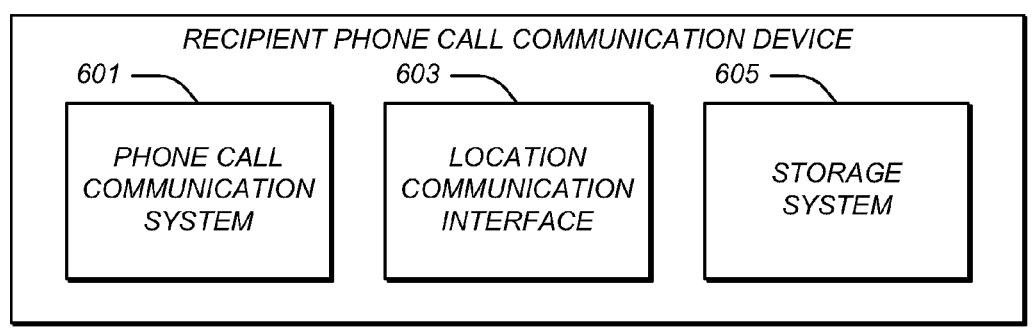
FIG. 5 is an example of envelope information which may be delivered by one of the mobile communication devices illustrated in FIG. 1 along with a voicemail message.
FIG. 6 is an example of a device which may be used to receive, store, and communicate location information to a user of the device in connection with a voicemail message.

FIG. 5 is an example of envelope information which may be delivered by one of the mobile communication devices illustrated in FIG. 1 along with a voicemail message.

As illustrated in FIG. 5, the metadata that goes along with a voicemail message may be in an envelope (also known as a header) which is associated with the voicemail message. The envelope may include information such as the sender's mobile directory number (MDN) 501, the intended recipient's MDN 503, a message priority specification 505, a message sensitivity specification 507, a date/time stamp 509 for the message, and sender location information 511 indicative of the location of the sender.

The sender location information 511 may be in any format. For example, it may include information indicative of the geographic coordinates of the sender and/or the address of the sender, all at the time the voicemail message is being provided.

FIG. 6 is an example of a recipient phone call communication device which may be used to receive, store, and communicate location information in connection with a voicemail message to a user of the device.

The recipient phone call communication device which is illustrated in FIG. 6 may be illustrative of the components contained within the recipient phone call communication devices 113, 115, and/or 117 illustrated in FIG. 1, or in connection with any other type of recipient phone call communication device. Similarly, the recipient phone call communication devices 113, 115, and/or 117 illustrated in FIG. 1 may have a configuration that is different from what is illustrated in FIG. 6.

As illustrated in FIG. 6, the recipient phone call communication device may include a network communication system 601, a location communication interface 603, and a storage system 605.

The network communication system may be configured to receive phone calls over a network communication system from wireless mobile communication devices. Each phone call may include metadata containing location information indicative of the location of the mobile communication device at approximately the time the location information is sent by the mobile communication device.

The location communication interface 603 may be configured to cause the location information to be communicated to a user of the communication device. The communication may be in a textual format which is displayed and/or an audible format which may be audibly communicated to a user.

The location communication interface 603 may be configured to cause the location information to be communicated to the user contemporaneously with the arrival of the phone call, before it is answered. Again, this information may be displayed and/or communicated audibly.

The storage system 605 may be configured to store the location information. The storage system may include any type of storage device, such as a RAM and/or flash memory.

The location communication interface 603 may be configured to cause the location information to be stored in the storage system 605 if the phone call is not answered by the user and to be communicated to the user thereafter upon request of the user.

Figure 7:
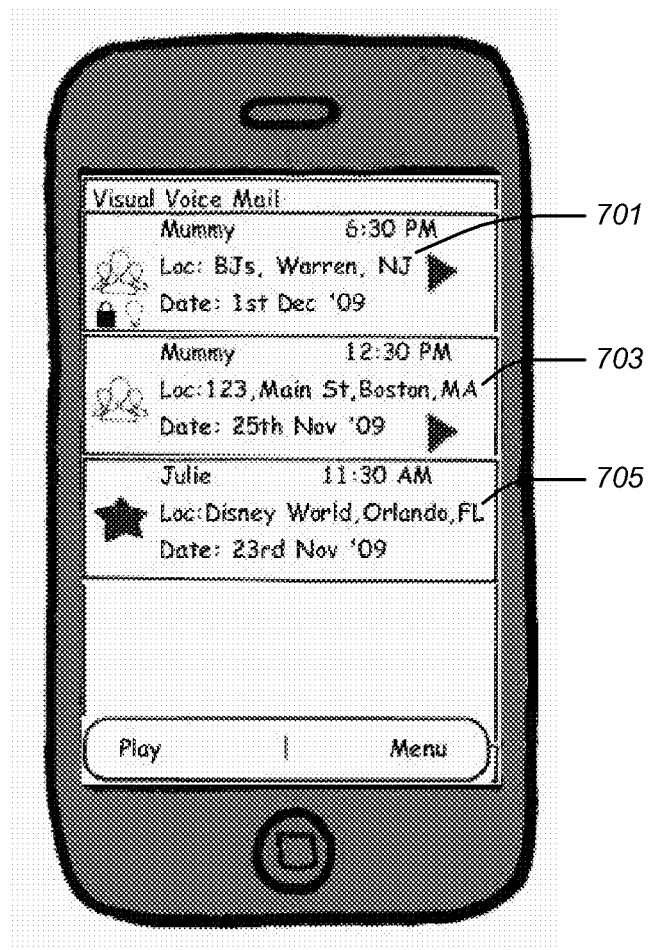
FIG. 7 is an example of a display which may be appear in connection with the recipient phone call communication device illustrated in FIG. 6.

FIG. 7 is an example of a display which may appear in connection with the recipient phone call communication device illustrated in FIG. 6.

This type of display may be found in connection with recipient phone call communication devices which subscribe to a visual voicemail service, thereby presenting voicemail messages in a form similar to email messages. As illustrated in FIG. 7, the record of each voicemail message may include location information, such as location information 701, 702, and 705, in addition to more traditional information, such as the name of the sender and the time and date of the message.

Figure 8:
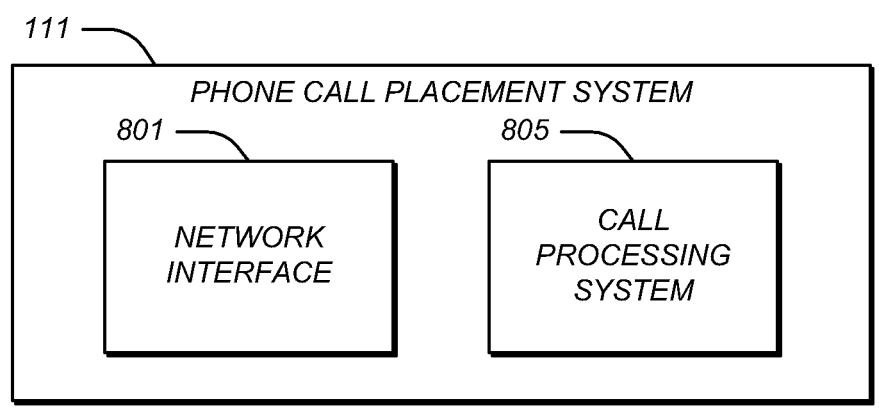
FIG. 8 is an example of the telephone switch illustrated in FIG. 1.

FIG. 8 is an example of the telephone switch 111 illustrated in FIG. 1. The telephone switch 111 illustrated in FIG. 1 may be different from the telephone switch illustrated in FIG. 8. Similarly, the telephone switch illustrated in FIG. 8 may be used in computer networks which are different from the one illustrated in FIG. 1.

As illustrated in FIG. 8, the telephone switch may include a network interface 801 and a call processing system 805.

The network interface 801 may be configured to receive from each mobile communication device recipient information indicative of a recipient for a phone call which the mobile communication device wishes to place. Along with the recipient information, the network interface 801 may be configured to receive metadata relating to the phone call containing location information indicative of the location of the mobile communication device at approximately the time the phone call is being placed by the mobile communication device. The network interface 801 may also be configured to send a notice to each recipient indicating that a mobile communication device is calling, along with the location information.

The call processing system 805 may be configured to cause the network interface 801 to send a notice to each recipient, indicating that a mobile communication device is calling, along with the location information.

Unless otherwise indicated, the voicemail message systems and telephone switches that have been discussed herein may each be implemented with a computer system configured to perform the functions which have been described herein for the component. Each computer system may include one or more computers at the same or different locations. When at different locations, the computers may be configured to communicate with one another through a wired and/or wireless network communication system. Each computer may include one or more processors, memory devices (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, mice, displays, microphones, sound reproduction systems, and/or touch screens).

Each computer may be a personal computer, mainframe, workstation, single user system, multi-user system, server, portable computer, hand-held device, cell phone, smart cell phone, tablet, or part of a larger system, such as a vehicle, appliance, and/or telephone system. Each computer may include software (e.g., one or more operating systems, device drivers, application programs, and/or communication programs), which may be configured when executed to cause the computer to perform one or more of the functions which have been described herein for the computer system. The software may include programming instructions and associated data and libraries. The software may implement one or more algorithms which may cause the computer to perform each function. The software may be stored on one or more tangible storage devices, such as one or more hard disk drives, CDs, DVDs, and/or flash memories. The software may be in source code and/or object code format. Associated data may be stored in any type of volatile and/or non-volatile memory.

The components, steps, features, objects, benefits, and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits, and advantages. These also include embodiments in which the components and/or steps are arranged and/or ordered differently.

For example, the messages which have thus-far been discussed have been designated as voicemail messages. In other configurations, the various devices which have been discussed may be configured to provide, receive, question, communicate, and to otherwise manipulate messages of other types with the same location information, such as text-based messages, such as instant messages, text messages, and email messages, including SMS messages and MMS messages.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim means that the claim is not intended and should not be interpreted to be limited to any of the corresponding structures, materials, or acts or to their equivalents.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents. Notwithstanding, none of the claims are intended to embrace subject matter which fails to satisfy the requirement of Sections 101, 102, or 103 of the Patent Act, nor should they be interpreted in such a way. Any unintended embracing of such subject matter is hereby disclaimed.

Except as stated immediately above, nothing which has been stated or illustrated is intended or should be interpreted to cause a dedication of any component, step, feature, object, benefit, advantage, or equivalent to the public, regardless of whether it is or is not recited in the claims.

The invention claimed is:

1. A voicemail message system for processing voicemail messages sent by mobile communication devices comprising:
   a network interface configured to receive the messages over a network communication system, each of at least some of the messages including metadata relating to the message containing location information indicative of a location of a mobile communication device at approximately a time the message is sent by the mobile communication device;
   a voicemail message storage system configured to store the received messages; and
   a voicemail message processing system configured to cause each message which is received by the network interface to be stored in the message storage system and for each received message, configured to, dependent on whether the received message includes location information:
   a) send a question in a text format to the mobile communication device over the network communication system when the message received from the mobile communication device includes location information, the question asking whether the location information should be included with the voicemail message,
   receive a response to the question from the mobile communication device over the network communication system,
   wherein if the response to the question is in the affirmative, then the location information is stored by the voicemail message storage system, and if the response to the question is in the negative, the location information is not stored by the voicemail message storage system; and
   b) not send the question to the mobile communication device when the received message does not include the location information.

2. The voicemail message system of claim 1 wherein the metadata is contained within a message envelope.

3. The voicemail message system of claim 1 wherein:
   the metadata of each message includes recipient information indicative of at least one intended recipient of each voicemail message;
   the network interface is configured to deliver each voicemail message to its intended recipient over the network communication system; and
   the voicemail message processing system is configured to cause the network interface to deliver each voicemail message to its intended recipient over the network communication system.

4. The voicemail message system of claim 3 wherein the voicemail message processing system is configured to cause the network interface to send the location information over the network communication system in an audible format.

5. The voicemail message system of claim 3 wherein the voicemail message processing system is configured to cause the network interface to send the location information over the network communication system in a text format.

6. The voicemail message system of claim 1 wherein:
   the location information includes information about the geographic coordinates of each mobile communication device from which the location information was received; and the voicemail message processing system is configured to translate each set of the geographic coordinates into a street address.

7. The voicemail message system of claim 1 wherein:
the question is sent at approximately a time the voicemail message processing system receives the voicemail message from the mobile communication device that includes location information.

8. A method for processing voicemail messages sent by mobile communication devices, the method comprising:
receiving, by a network interface, messages over a network communication system, each of at least some of the messages including metadata relating to the message containing location information indicative of a location of a mobile communication device at approximately a time the message is sent by the mobile communication device;
storing, by a voicemail message storage system, the received messages; and
processing, by a voicemail message processing system each message which is received by the network interface to be stored in the message storage system, and for each received message, dependent on whether the received message includes location information:
a) sending a question in a text format to the mobile communication device over the network communication system when the message received from the mobile communication device includes location information, the question asking whether the location information should be included with the voicemail message,
receiving a response to the question from the mobile communication device over the network communication system,
wherein if the response to the question is in the affirmative, then the location information is stored by the voicemail message storage system, and if the response to the question is in the negative, the location information is not stored by the voicemail message storage system; and
b) not sending a question to a mobile communication device when the received message does not include the location information.

9. The method of claim 8, further comprising
including recipient information in the metadata, the recipient information indicative of at least one intended recipient of each voicemail message;
delivering each voicemail message to its intended recipient over the network communication system; and
delivering by the network interface, each voicemail message to its intended recipient over the network communication system.

10. The method of claim 9, further comprising
sending by the network interface, the location information over the network communication system in an audible format.

11. The method of claim 9, further comprising
sending by the network interface, the location information over the network communication system in a text format.

12. The method of claim 8, further comprising
including in the location information, information about the geographic coordinates of each mobile communication device from which the location information was received; and
translating each set of the geographic coordinates into a street address.

13. The method of claim 8, further comprising
sending the question at approximately a time the voicemail message processing system receives the voicemail message from the mobile communication device that includes location information.

14. A non-transitory computer readable medium having a program stored thereon for processing voicemail messages sent by mobile communication devices, the program comprising:
receiving, by a network interface, messages over a network communication system, each of at least some of the messages including metadata relating to the message containing location information indicative of a location of a mobile communication device at approximately a time the message is sent by the mobile communication device;
storing, by a voicemail message storage system, the received messages; and
processing, by a voicemail message processing system each message which is received by the network interface to be stored in the message storage system, and for each received message, dependent on whether the received message includes location information:
a) sending a question in a text format to the mobile communication device over the network communication system when the message received from the mobile communication device includes location information, the question asking whether the location information should be included with the voicemail message,
receiving a response to the question from the mobile communication device over the network communication system,
wherein if the response to the question is in the affirmative, then the location information is stored by the voicemail message storage system, and if the response to the question is in the negative, the location information is not stored by the voicemail message storage system; and
b) not sending a question to a mobile communication device when the received message does not include the location information.

15. The non-transitory computer readable medium of claim 14, further comprising
including recipient information in the metadata, the recipient information indicative of at least one intended recipient of each voicemail message;
delivering each voicemail message to its intended recipient over the network communication system; and
delivering by the network interface, each voicemail message to its intended recipient over the network communication system.

16. The non-transitory computer readable medium of claim 15, further comprising
sending by the network interface, the location information over the network communication system in an audible format.

17. The non-transitory computer readable medium of claim 15, further comprising
sending by the network interface, the location information over the network communication system in a text format.

18. The non-transitory computer readable medium of claim 14, further comprising
including in the location information, information about the geographic coordinates of each mobile communication device from which the location information was received; and
translating each set of the geographic coordinates into a street address.

19. The non-transitory computer readable medium of claim 14, further comprising
sending the question at approximately a time the voicemail message processing system receives the voicemail message from the mobile communication device that includes location information.

* * * * *